United States Patent
Adamson

(10) Patent No.: US 9,134,195 B1
(45) Date of Patent: Sep. 15, 2015

(54) METHODS AND SYSTEMS FOR ENABLING WIND TUNNEL MODELS TO TRANSITION BETWEEN MEASURING AERODYNAMIC FORCES AND MEASURING ACOUSTIC SIGNATURES

(71) Applicant: The Boeing Company, Seal Beach, CA (US)

(72) Inventor: Eric Evin Adamson, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 340 days.

(21) Appl. No.: 13/733,532

(22) Filed: Jan. 3, 2013

(51) Int. Cl.
*G01M 9/00* (2006.01)
*G01M 9/04* (2006.01)

(52) U.S. Cl.
CPC ....................... *G01M 9/04* (2013.01)

(58) Field of Classification Search
None
See application file for complete search history.

(56) References Cited

U.S. PATENT DOCUMENTS

| | | | | |
|---|---|---|---|---|
| 3,587,306 A * | 6/1971 | Bryan | | 73/147 |
| 4,074,567 A * | 2/1978 | Horanoff | | 73/147 |
| 4,207,764 A * | 6/1980 | Wallace | | 73/147 |
| 4,327,581 A * | 5/1982 | Jackson et al. | | 73/147 |
| 4,663,967 A * | 5/1987 | Parkinson | | 73/147 |
| 4,688,421 A * | 8/1987 | Pzsolla | | 73/147 |
| 4,938,058 A * | 7/1990 | Girard | | 73/147 |
| 5,020,364 A * | 6/1991 | Manitt et al. | | 73/147 |
| 5,365,782 A * | 11/1994 | Bouis et al. | | 73/147 |
| 6,962,076 B2 * | 11/2005 | Page et al. | | 73/147 |
| 7,302,839 B1 | 12/2007 | Felter et al. | | |
| 7,997,130 B1 * | 8/2011 | Stonner et al. | | 73/147 |
| 8,145,366 B1 | 3/2012 | Haering et al. | | |
| 8,534,112 B2 * | 9/2013 | Huertos Sanz | | 73/1.79 |
| 8,833,153 B2 * | 9/2014 | Adamson et al. | | 73/147 |

* cited by examiner

*Primary Examiner* — Peter Macchiarolo
*Assistant Examiner* — Jermaine Jenkins
(74) *Attorney, Agent, or Firm* — Armstrong Teasdale LLP

(57) ABSTRACT

A model adapter includes a first section of an off-body adapter at least partially circumscribing a sting mount, and a second section of the off-body adapter coupled to the first section such that the off-body adapter is coupled to the sting mount. The off-body adapter is positioned aft of the model to provide for a substantially aerodynamically smooth transition between a model and the sting mount.

20 Claims, 3 Drawing Sheets

METHODS AND SYSTEMS FOR ENABLING WIND TUNNEL MODELS TO TRANSITION BETWEEN MEASURING AERODYNAMIC FORCES AND MEASURING ACOUSTIC SIGNATURES

BACKGROUND

The present disclosure relates generally to wind tunnel models and, more particularly, to methods and systems that facilitate the transition between a first test setup utilized to measure aerodynamic forces on a wind tunnel model and a second test setup utilized to measure acoustic signatures.

To determine aerodynamic properties of a vehicle or object, a model of the object may be subjected to a wind tunnel test. Air is channeled through the wind tunnel, and the effects of the air moving past the model are observed and/or measured. At least some known systems include a first test setup for measuring aerodynamic forces and a second test setup for measuring acoustic signatures. Known methods and systems of transitioning between the two test setups, however, is generally time consuming and tedious.

BRIEF SUMMARY

In one aspect, a method is provided for use in transitioning a model from measuring aerodynamic forces to measuring acoustic signatures. The method includes positioning a first section of an off-body adapter such that the first section at least partially circumscribes a sting mount. A second section of the off-body adapter is coupled to the first section such that the off-body adapter is coupled to the sting mount. The off-body adapter provides for a substantially aerodynamically smooth transition between the model and the sting mount.

In another aspect, a model adapter is provided for use with a sting mount. The model adapter includes a first section of an off-body adapter at least partially circumscribing the sting mount, and a second section of the off-body adapter coupled to the first section such that the off-body adapter is coupled to the sting mount. The off-body adapter is positioned aft of the model to provide for a substantially aerodynamically smooth transition between a model and the sting mount.

In yet another aspect, a wind tunnel is provided. The wind tunnel includes a sting mount and a model adapter. The model adapter includes a first section of an off-body adapter at least partially circumscribing the sting mount, and a second section of the off-body adapter coupled to the first section such that the off-body adapter is coupled to the sting mount. The off-body adapter is positioned aft of the model to provide for a substantially aerodynamically smooth transition between a model and the sting mount.

The features, functions, and advantages described herein may be achieved independently in various implementations described in the present disclosure or may be combined in yet other implementations, further details of which may be seen with reference to the following description and drawings.

Although specific features of various implementations may be shown in some drawings and not in others, this is for convenience only. Any feature of any drawing may be referenced and/or claimed in combination with any feature of any other drawing.

DETAILED DESCRIPTION

The present disclosure relates generally to wind tunnel models and, more particularly, to methods and systems for use in enabling sonic boom testing of wind tunnel models. In one implementation, an adapter converts a conventional model into a boom model that may be used to conduct sonic boom testing of the model. The adapter includes a first section of an off-body adapter at least partially circumscribing the sting mount, and a second section of the off-body adapter coupled to the first section such that the off-body adapter is coupled to the sting mount. The off-body adapter is positioned aft of the model to provide for a substantially aerodynamically smooth transition between a model and the sting mount.

As used herein, an element or step recited in the singular and preceded with the word "a" or "an" should be understood as not excluding plural elements or steps unless such exclusion is explicitly recited. Moreover, references to "one implementation" are not intended to be interpreted as excluding the existence of additional implementations that also incorporate the recited features.

Figure 1:
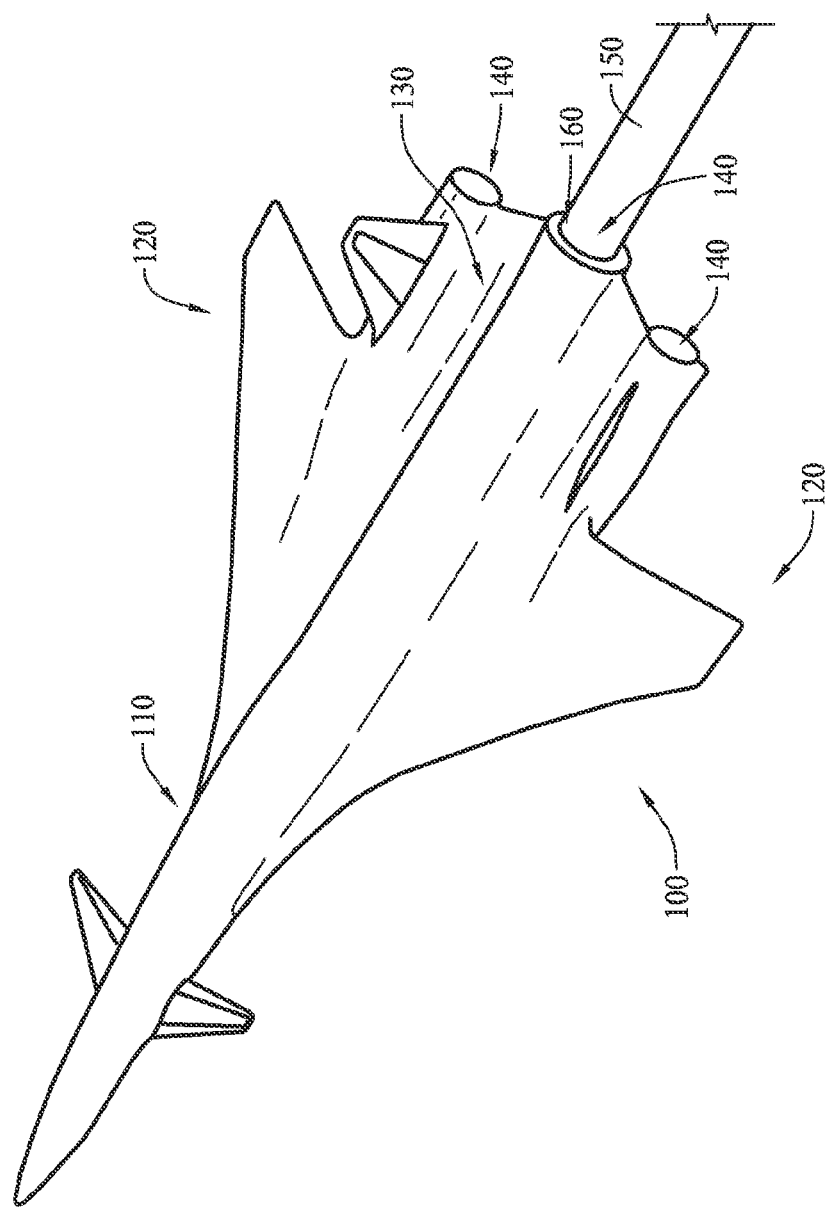
FIG. 1 is a perspective view of a conventional model.

FIG. 1 is a perspective view of a conventional model 100 positioned within a wind tunnel (not shown). In some implementations, model 100 includes a body 110 and a pair of wings 120 that extend generally laterally from body 110. In some implementations, model 100 includes an aft portion 130 that includes at least one opening 140 defined therein. In some implementations, a sting mount 150 extends through opening 140 such that sting mount 150 is positioned substantially within model 100. In at least some implementations, sting mount 150 includes, or is coupled to, a force balance (not shown in FIG. 1). That is, in such implementations, the force balance is an internal balance. Alternatively, in other implementations, the force balance may be an external balance and be positioned outside model 100.

In some implementations, aft portion 130 is flared to accommodate or house a predetermined size and/or volume of sting mount 150 such that a gap 160 is defined between model 100 and sting mount 150. In at least some implementations, model 100 moves with respect to sting mount 150 during wind tunnel testing such that aerodynamic properties of model 100 may be measured and/or determined. More particularly, in at least some implementations, the force balance measures and/or detects lift, drag, lateral force, yaw, roll, and/or pitching moment over a range of angle of attack based on the relevant movement of model 100.

Figure 2:
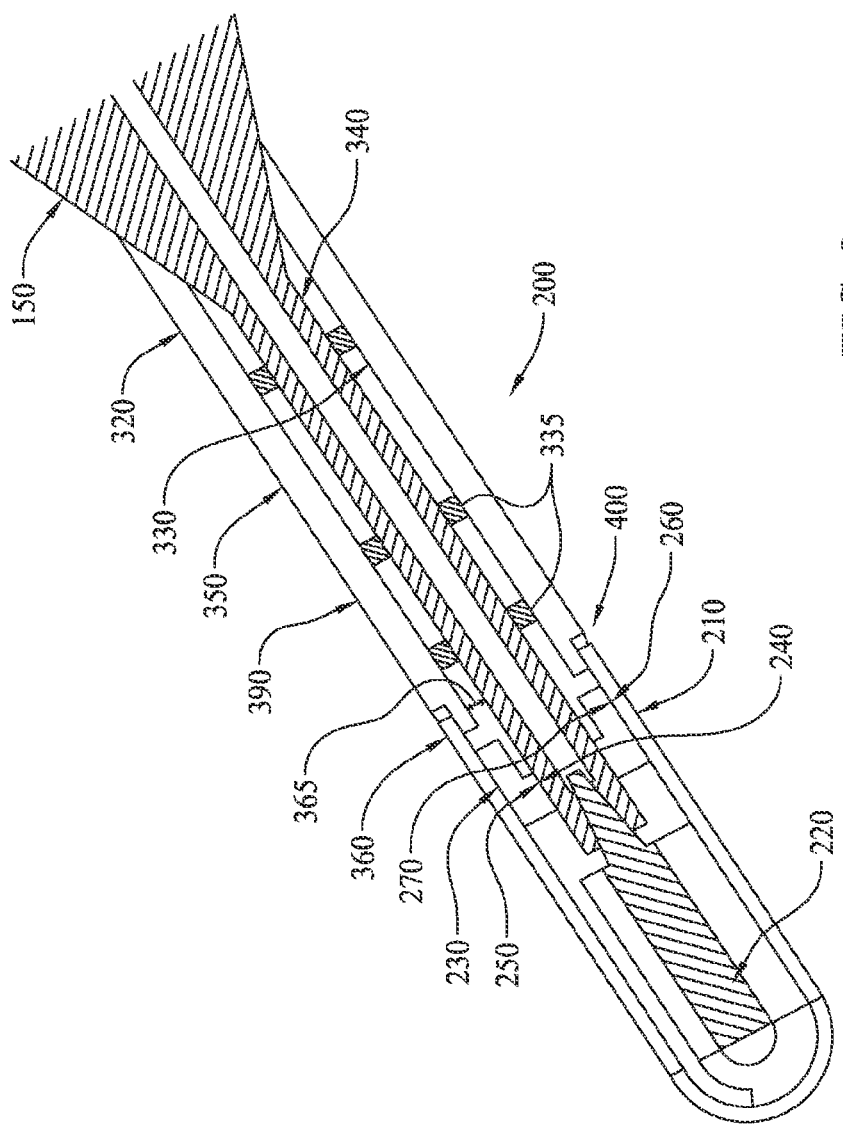
FIG. 2 is a cross-sectional view of an exemplary adapter that may be used with the model shown in FIG. 1.

FIG. 2 is a cross-sectional view of an exemplary model adapter 200. In some implementations, model 100 includes a baseline tail can 210 at aft portion 130 (shown in FIG. 1) of model 100. In some implementations, sting mount 150 includes, and/or is coupled to, a force balance 220 and extends longitudinally through baseline tail can 210 and/or body 110 such that a portion of sting mount 150 and/or force balance 220 is positioned within a cavity defined within model 100.

To enable model 100 to undergo and/or to withstand a sonic boom test (e.g., endure wind speeds that are at least 340.29 m/s at sea level), in some implementations, a collar 230 is coupled to model 100 and/or to sting mount 150. More specifically, in at least some implementations, collar 230 is securely coupled to model 100 and/or sting mount 150 to "lock out", restrict, and/or prevent movement of model 100 with respect to sting mount 150. As used herein, the phrase "lock out" should be understood as reducing and/or eliminating a movement of one component with respect to another component. Accordingly, in some implementations, model 100 is "locked out" when model 100 is securely coupled to sting mount 150 such that model 100 does not move relative to sting mount 150 and, thus, substantially no force and/or moment is detected by force balance 220. Collar 230 may be fabricated from any material or combination of materials that enables model 100 to be "locked out" with respect to sting mount 150.

In some implementations, collar 230 substantially circumscribes sting mount 150 such that baseline tail can 210 and/or body 110 is securely coupled to sting mount 150. In some implementations, collar 230 has a radially inner surface 240 that substantially mates against a radially outer surface 250 of sting mount 150, and a radially outer surface 260 that substantially mates against a radially inner surface 270 of baseline tail can 210. Accordingly, in at least some implementations, collar 230 has an internal profile that mates substantially flush against an external profile of sting mount 150, and collar 230 has an external profile that mates substantially flush against an internal profile of baseline tail can 210. In some implementations, collar inner surface 240 includes a step that facilitates transmitting and/or carrying a load substantially forward from model 100 to sting mount 150.

Figure 3:
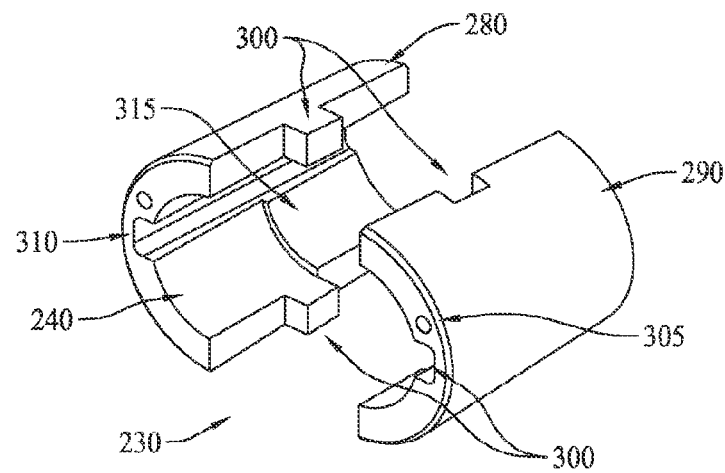
FIG. 3 is a perspective view of an exemplary collar of the adapter shown in FIG. 2.

As shown in FIG. 3, in some implementations, collar 230 is substantially frustoconical in shape and includes a first section 280 and a second section 290 coupled to first section 280. In at least some implementations, each section 280 and 290 includes at least one indexing feature 300 for maintaining radial and/or axial alignment of sections 280 and 290. For example, in at least one implementation, indexing feature 300 is a blind hole sized to receive a dowel (not shown) therein in a sliding fit configuration. Alternatively, in other implementations, first section 280 may be coupled to second section 290 using any other indexing feature 300 that maintains radial and/or axial alignment of sections 280 and 290. In some implementations, collar inner surface 240 defines a groove 310 that extends longitudinally across collar inner surface 240 and that is sized to provide a chase for and/or retain pressure tubing (not shown) coupled to force balance 220.

In some implementations, an off-body adapter 320 is coupled to model 100 and/or to sting mount 150 such that off-body adapter 320 substantially reduces and/or closes gap 160 defined between model 100 and sting mount 150. More specifically, in at least some implementations, off-body adapter 320 substantially circumscribes sting mount 150 such that off-body adapter 320 substantially occupies a wake area aft of model 100 and provides for a substantially aerodynamically smooth transition between model 100 and sting mount 150.

In some implementations, off-body adapter 320 has a radially inner surface 330 that substantially mates against a radially outer surface 340 of sting mount 150. In at least one implementation, inner surface 330 includes a plurality of bushings 335, O-rings, or the like to provide non-continuous support. Alternatively, in another implementation, inner surface 330 may form a continuous support. Accordingly, in at least some implementations, off-body adapter 320 has an internal profile that mates substantially flush against an external profile of sting mount 150. In at least some embodiments, inner surface 330 may be a compliant member and/or fabricated at least partially from a compliant material such as, without limitation, a low modulus material, an elastomer, plastic, and/or semi-rigid foam. Alternatively, in other implementations, inner surface 330 may be fabricated from any other material that enables inner surface 330 to substantially mate against outer surface 340. In some implementations, off-body adapter 320 has a radially outer surface 350 that is substantially flush with a radially outer surface 360 of baseline tail can 210 such that outer surfaces 350 and 360 are substantially even or level. In some implementations, off-body adapter 320 is configured such that an axial gap 365 is formed between at least a portion of off-body adapter 320 and sting mount 150.

Figure 4:
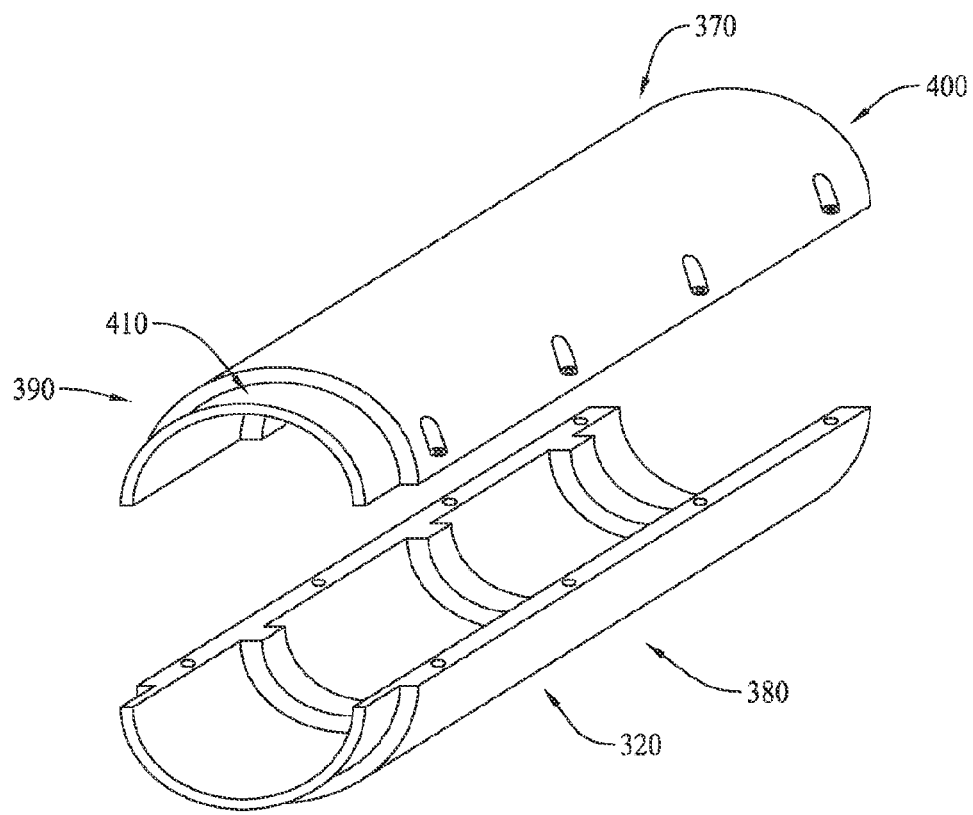
FIG. 4 is a perspective view of an exemplary off-body adapter of the adapter shown in FIG. 2.

As shown in FIG. 4, in some implementations, off-body adapter 320 includes a first section 370 and a second section 380 coupled to first section 370. In some implementations, a fore portion 390 of off-body adapter 320 is nested within an aft portion 400 (shown in FIG. 2) of baseline tail can 210 and/or mates substantially flush against an aft end of collar 230. More specifically, in at least some implementations, fore portion 390 includes a step 410 that extends circumferentially about fore portion 390 to enable off-body adapter 320 to be coupled in an overlapping relationship to baseline tail can 210. That is, in at least some implementations, baseline tail can aft portion 400 is sized to receive at least a segment of fore portion 390 in a sliding fit or friction fit configuration that enables off-body adapter 320 and baseline tail can 210 to be coupled securely together. Alternatively, in other implementations, off-body adapter 320 may be coupled to baseline tail can 210 using any coupling mechanism that provides for a substantially aerodynamically smooth transition between off-body adapter 320 and baseline tail can 210.

In some implementations, model adapter 200 facilitates securing model 100 to sting mount 150 such that model 100 can undergo and/or withstand a sonic boom test. To assemble model adapter 200, in at least some implementations, collar first section 280 and collar second section 290 are coupled together around sting mount 150 to form collar 230, and collar 230 is positioned within baseline tail can 210 to enable model 100 to be "locked out" with respect to sting assembly 150.

In some implementations, off-body adapter first section 370 and off-body adapter second section 380 are coupled together around sting mount 150, and off-body adapter 320 is positioned against collar 230 to facilitate holding collar 230 in positioned within baseline tail can 210. In some implementations, off-body adapter 320 is securely coupled to sting mount 150 and aligned with respect to model 100. More specifically, in at least some implementations, off-body adapter 320 is aligned such that off-body adapter 320 substantially closes gap 160 defined between model 100 and sting mount 150 and off-body adapter outer surface 350 is substantially flush with baseline tail can outer surface 360.

The present disclosure relates generally to wind tunnel models and, more particularly, to methods and systems for use in enabling sonic boom testing of wind tunnel models. The implementations described herein enable a force model to be efficiently and effectively converted into a boom model to conduct sonic boom testing of the model. Accordingly, the embodiments described herein securely couple the model to a sting mount and facilitates reducing or closing a gap defined between the model and the sting mount.

Exemplary implementations of a model adapter are described above in detail. The methods and systems are not limited to the implementations described herein, but rather, components of systems and/or steps of the method may be utilized independently and separately from other components and/or steps described herein. Each method step and each component may also be used in combination with other method steps and/or components. Although specific features of various implementations may be shown in some drawings and not in others, this is for convenience only. Any feature of a drawing may be referenced and/or claimed in combination with any feature of any other drawing.

This written description uses various implementations to disclose the subject matter, including the best mode, and also to enable any person skilled in the art to practice the implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of transitioning a model from measuring aerodynamic forces to measuring acoustic signatures, said method comprising:
    positioning a first section of an off-body adapter such that the first section at least partially circumscribes a sting mount; and
    removably coupling a second section of the off-body adapter to the first section such that the off-body adapter is coupled to the sting mount, the off-body adapter providing for a substantially aerodynamically smooth transition between the model and the sting mount.

2. A method in accordance with claim 1 further comprising coupling a collar to the sting mount such that the collar securely couples the model to the sting mount, the collar substantially circumscribing the sting mount.

3. A method in accordance with claim 2, wherein coupling a collar further comprises coupling a first section of the collar to a second section of the collar.

4. A method in accordance with claim 2 further comprising pressing the off-body adapter substantially against a radial surface of the collar.

5. A model adapter for use with a sting mount, said model adapter comprising:
    a first section of an off-body adapter at least partially circumscribing the sting mount; and
    a second section of the off-body adapter removably coupled to said first section such that the off-body adapter is coupled to the sting mount, the off-body adapter positioned aft of the model to provide for a substantially aerodynamically smooth transition between a model and the sting mount.

6. A model adapter in accordance with claim 5 further comprising a collar substantially circumscribing the sting mount to facilitate securely coupling the model to the sting mount.

7. A model adapter in accordance with claim 6, wherein said collar comprises a first section and a second section coupled to said first section of said collar.

8. A model adapter in accordance with claim 6, wherein said collar has an inner surface and an outer surface, wherein said inner surface substantially complements an outer surface of the sting mount, wherein said outer surface substantially complements an inner surface of a baseline tail can, wherein the baseline tail can is directly coupled to the model.

9. A model adapter in accordance with claim 6, wherein said collar has an inner surface that defines a groove sized to house pressure tubing.

10. A model adapter in accordance with claim 6, wherein the off-body adapter comprises a fore portion that is coupled to an aft portion of said collar.

11. A model adapter in accordance with claim 5, wherein the off-body adapter has an outer surface that comprises a step configured to couple the off-body adapter to a baseline tail can, wherein the baseline tail can is directly coupled to the model.

12. A model adapter in accordance with claim 5, wherein
    the off-body adapter has an outer diameter that is one of the same as and substantially similar to an outer diameter of a baseline tail can, wherein the baseline tail can is directly coupled to the model, and wherein the off-body adapter includes an inner surface that substantially complements an outer surface of the sting mount.

13. A wind tunnel comprising:
    a sting mount; and
    a model adapter comprising a first section of an off-body adapter at least partially circumscribing said sting mount, and a second section of the off-body adapter removably coupled to said first section such that the off-body adapter is coupled to said sting mount, the off-body adapter positioned aft of the model to provide for a substantially aerodynamically smooth transition between a model and said sting mount.

14. A wind tunnel in accordance with claim 13, wherein a portion of said sting mount is positioned within a cavity defined by the model.

15. A wind tunnel in accordance with claim 13 further comprising a collar substantially circumscribing said sting mount to facilitate securely coupling the model to said sting mount.

16. A wind tunnel in accordance with claim 15, wherein said collar comprises a first section and a second section coupled to said first section of said collar.

17. A wind tunnel in accordance with claim 15, wherein said collar has an inner surface and an outer surface, wherein said inner surface substantially complements an outer surface of said sting mount, wherein said outer surface that substantially complements an inner surface of a baseline tail can, wherein the baseline tail can is directly coupled to the model.

18. A wind tunnel in accordance with claim 15, wherein the off-body adapter comprises a fore portion that is coupled to an aft portion of said collar.

19. A wind tunnel in accordance with claim 13, wherein the off-body adapter has an outer surface that comprises a step configured to couple the off-body adapter to a baseline tail can, wherein the baseline tail can is directly coupled to the model.

20. A wind tunnel in accordance with claim 13, wherein the off-body adapter has an outer diameter that is one of the same as and substantially similar to an outer diameter of a baseline tail can, wherein the baseline tail can is directly coupled to the model, and wherein the off-body adapter includes an inner surface that substantially complements an outer surface of the sting mount.

* * * * *